United States Patent [19]

Glatthorn

[11] Patent Number: 4,576,068

[45] Date of Patent: Mar. 18, 1986

[54] CAM-CONTROLLED BORING BAR

[75] Inventor: Raymond H. Glatthorn, St. Petersburg, Fla.

[73] Assignee: The United States of America as represented by the United States Department of Energy, Washington, D.C.

[21] Appl. No.: 576,646

[22] Filed: Feb. 3, 1984

[51] Int. Cl.⁴ .................. B23B 29/034; B23B 3/26
[52] U.S. Cl. .................................. 82/1.4; 82/19; 408/158; 408/181
[58] Field of Search .......... 408/153, 158, 181; 82/1.2, 1.4, 2 E, 2 D, 1.3, 1.5, 11, 12, 19; 29/57

[56] References Cited

U.S. PATENT DOCUMENTS

| | | | |
|---|---|---|---|
| 2,382,571 | 8/1945 | Kylin | 408/181 |
| 2,804,786 | 9/1957 | Stenger | 82/1.2 |
| 3,228,265 | 1/1966 | Stoddard et al. | 408/158 |
| 3,813,969 | 6/1974 | Wheeler | 82/19 |
| 3,854,839 | 12/1974 | Gottelt | 82/1.5 |
| 4,354,305 | 10/1982 | Plummer et al. | 82/1.4 |
| 4,357,846 | 11/1982 | Primo | 82/1.2 |

FOREIGN PATENT DOCUMENTS 611733 6/1978 U.S.S.R. ................................. 82/19

Primary Examiner—Leonidas Vlachos
Assistant Examiner—Jerry Kearns
Attorney, Agent, or Firm—Daniel C. Abeles

[57] ABSTRACT

A cam-controlled boring bar system (100) includes a first housing (152) which is rotatable about its longitudinal axis (154), and a second housing in the form of a cam-controlled slide (158) which is also rotatable about the axis (154) as well as being translatable therealong. A tool-holder (180) is mounted within the slide (158) for holding a single point cutting tool. Slide (158) has a rectangular configuration and is disposed within a rectangularly configured portion of the first housing (152). Arcuate cam slots (192) are defined within a side plate (172) of the housing (152), while cam followers (194) are mounted upon the cam slide (158) for cooperative engagement with the cam slots (192). In this manner, as the housing (152) and slide (158) rotate, and as the slide (158) also translates, a through-bore (14) having an hourglass configuration will be formed within a workpiece (16) which may be, for example, a nuclear reactor steam generator tube support plate.

20 Claims, 3 Drawing Figures

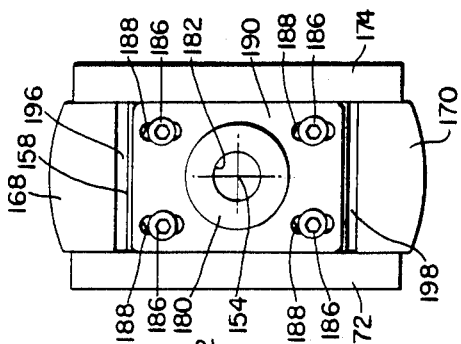
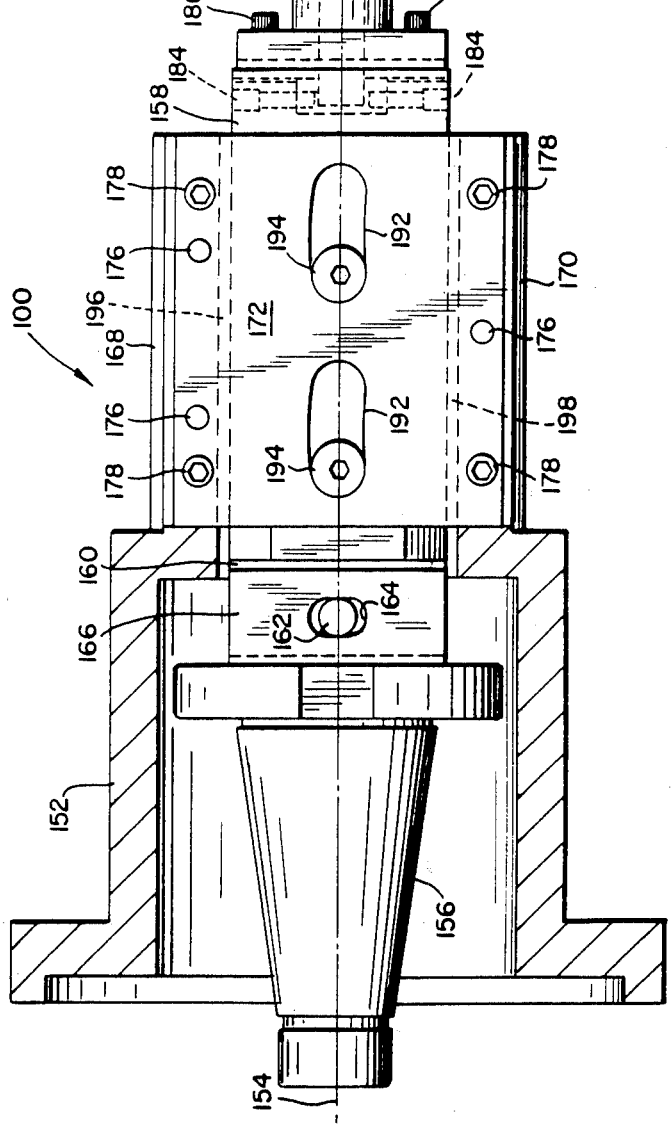

4,576,068

CAM-CONTROLLED BORING BAR

STATEMENT OF GOVERNMENT INTEREST

The present invention was either first conceived or reduced to practice under a contract with the U.S. Government, Contract Number DE-AC02-77ET-37201.

BACKGROUND OF THE INVENTION

1. Field of the Invention

The present invention relates generally to boring mills, and more particularly to a cam-controlled boring bar tool system which is particularly capable of boring or forming a particularly configured through-bore, such as, for example, one having a continuously internally-variable radial extent as determined by means of a constant external radiused curvature in the form of an hourglass, within each tube support plate of a nuclear reactor steam generator heat exchanger at each location at which a vertically extending water-steam generator tube passes through the tube support plates such that excessive wear of the water-steam generator tubes, as a result of relative movement defined between the tubes and the tube support plates under reactor operating conditions, is effectively eliminated or substantially reduced and optimally minimized.

2. Description of the Prior Art

A nuclear reactor produces heat as a result of the fission of nuclear material which is disposed within fuel rods, the fuel rods being secured together so as to define fuel assemblies. The fuel assemblies define the nuclear reactor core, and the core is disposed within a reactor or pressure vessel. In commercial nuclear reactor facilities, the heat produced by means of the fission processes is utilized to generate electricity. In particular, conventional facilities usually comprise one or more primary flow and heat transfer or exchange loops, and a corresponding number of secondary flow and heat transfer or exchange loops to which conventional steam generators and steam turbines, as well as electrical generators, are fluidically and mechanically connected, respectively. A typical energy conversion process for such commercial nuclear reactor facilities would therefore comprise the transfer of heat from the nuclear core to the primary coolant flow and loop system, from the primary coolant flow and loop system to the secondary coolant flow and loop system by means of suitable heat exchangers, and finally from the secondary coolant flow and loop system to the steam generators by means of further suitable heat exchangers. The generated steam is then of course transmitted to the steam turbines to which the electrical generators are operatively connected, and from which electricity is ultimately generated.

In a liquid metal-cooled fast breeder reactor, liquid sodium serves as the reactor coolant and is therefore circulated through the primary coolant flow and loop system which typically comprises the nuclear core, a heat exchanger, and a circulating pump. In nuclear reactors having more than one primary coolant flow loop within the primary coolant flow system, the nuclear core and the reactor pressure vessel, within which the nuclear core is disposed, are connected in common to each of the primary coolant flow loops. The heat generated by means of the nuclear core is thus removed therefrom by means of the reactor coolant which is conducted into the reactor vessel and through the reactor core. The heated reactor coolant then exits from the nuclear core and the reactor vessel so as to flow through the heat exchangers which serve to transfer the heat to the secondary flow system loops operatively associated therewith. Liquid sodium is likewise disposed within the secondary flow system loops, and, in turn, the heated sodium disposed within the secondary flow system loops passes through suitable heat exchangers so as to transfer its heat to the water being conducted through the steam generators whereby steam is generated for use within the steam turbines. The steam turbines are then of course utilized to drive the electric generators for generating electricity. The cooled reactor core sodium coolant disposed within the primary flow loop system is of course recirculated back to the reactor pressure vessel and the reactor core by means of the primary flow loop system circulating pump, the secondary sodium coolant is likewise recirculated by means of its recirculating pump, and the coolant cycles are repeated. An intermediate or secondary coolant loop system is acknowledged to be mandatory within a liquid metal-cooled fast breeder reactor in view of the fact that liquid sodium exhibits explosive instability in the presence of water. Consequently, should any leakage develop between the sodium and water flow loops or paths, it is imperative to, in effect, isolate the reactor core from any deleterious effects attendant the violent or explosive mixing of the sodium and water components. In addition, the sodium disposed within the primary coolant flow loop system becomes radioactive after having been circulated through the reactor core, whereas the sodium coolant disposed within the closed secondary flow loop system is not radioactive. Consequently, should any leakage develop within the primary coolant loop system, the secondary coolant loop system effectively serves as a buffer zone to maintain radioactive coolant out of the steam generator water and steam, and prevent contamination of the steam turbines and the electrical generator equipment.

Within one type of conventional, exemplary heat exchanger system defined between the intermediate or secondary non-radioactive liquid sodium coolant loop and the steam generator tubes through which water is conducted for the generation of steam, the water-steam generator tubes extend substantially vertically within the heat exchanger with the upper and lower ends of the tubes fixedly secured within upper or top, and lower or bottom, tubesheets, respectively. Suitable headers or manifolds fluidically surround the ends of the tubes and encase the tubesheets so as to supply water to, for example, the lower ends of the tubes and extract steam from the upper ends of the tubes. The liquid sodium enters the upper end of the heat exchanger at an elevational level below the upper or top tubesheet, and relatively cooled liquid sodium leaves the heat exchanger at an elevational level above the lower tubesheet. Consequently, the initially hot liquid sodium and initially cold water flow in opposite directions through the heat exchanger whereby the heat exchange process is conducted therebetween. In order to substantially restrain excessive lateral movements of the water-steam tubes within the heat exchanger under the influence of the downwardly flowing liquid sodium, which may exhibit cross-current flow paths or the like, or to substantially confine lateral movements of the water-steam tubes under any vibrational conditions which may manifest themselves, a plurality of vertically spaced tube support plates are fixedly suspended within the heat exchanger at positions intermediate the upper and lower tubesheets. The tube support plates are suspended in a stacked array from the upper or top tubesheet by means of a plurality of stay rods interposed between, and fixedly secured to, each tube support plate, and the entire array freely hangs downwardly from the upper or top tubesheet and is not fixed to the lower or bottom tubesheet. The water-steam tubes therefore pass through suitable apertures defined within the tube support plates such that the tubes are not fixedly secured to the tube support plates. Additional apertures are also provided within the tube support plates so as to permit the liquid sodium to pass therethrough, the liquid sodium also passing through the annular spaces defined between the water-steam tubes and the sidewalls of the apertures of the tube support plates through which the water-steam tubes pass, whereby the liquid sodium can traverse the vertical extent of the heat exchanger in furtherance of performance of its heat exchange function.

Within the aforenoted type of heat exchanger system, an operational deficiency has developed to the effect that excessive wear, and therefore a premature service life, of the water-steam tubes has manifested itself. The reason that such unacceptably excessive wear problems develop is due to the fact that during normal reactor operation, there is considerable movement of the water-steam tubes relative to the tube support plates, as well as considerable movement of the tube support plates relative to the water-steam tubes. For example, during start-up or transient operational conditions, the water-steam tubes may experience substantial vibrational loads which may cause movement of the same relative to the tube support plates. Cross-currents of the liquid sodium flowing through the heat exchanger may likewise cause transverse movement or buckling loads to be impressed upon the water-steam tubes thereby likewise causing movement of the same relative to the tube support plates. Such relative transverse movement of the water-steam tubes with respect to the tube support plates causes abrasive wear to be developed between the water-steam tubes and the sidewalls of the tube support plate apertures through which the water-steam tubes pass. Alternatively, during the start-up period of the power plant facility, the tube support plates and their stay rods are relatively cool and are at the same temperature as the water-steam tubes. However, as the plant or facility becomes operational, the tube support plates and their stay rods become very hot due to the fact that the heated liquid sodium is in direct contact therewith throughout the heat exchanger. To the contrary, the water-steam tubes will not experience a similar elevation in temperature level due to the fact that cold water is being initially circulated within the tubes and a change of state from water to steam absorbs a substantial amount of the heat energy through means of the heat exchange process. Consequently, the tube support plates, and particularly the stay rods thereof supporting the same, will experience substantial thermal growth whereby the tube support plates will in fact exhibit considerable movement relative to the water-steam tubes. In a similar manner, transient operating conditions may also result in variable thermal conditions prevailing within the heat exchanger whereby thermal expansion or contraction of the tube support plates and their stay rods may again be manifested. For example, should a pump failure occur within the liquid sodium coolant loop circulating system, the heated liquid sodium will be stagnantly disposed within the loop and the heat exchanger while the relatively cooler water will continue to be conducted through the water-steam tubes. A relative increase in the temperature level of the sodium will therefore be experienced relative to the water-steam tubes, and consequently, it follows that the tube support plates and the stay rods will likewise experience an elevation in temperature and thermal growth. Upon rectification of the circulating pump malfunction, steady-state operations will again prevail whereby the temperature level of the liquid sodium will be somewhat lowered whereby the tube support plates and stay rods would experience some thermal contraction relative to the water-steam tubes. All of such relative movements result in unacceptably excessive wear of the water-steam tubes whereby the same have to be replaced more frequently than would normally be expected or desired.

In order to alleviate the foregoing problems, it has been attempted to re-design the sidewalls of the tube support plate apertures through which the water-steam tubes pass so as to minimize the aforenoted excessive wear problems. In lieu of conventional, straight through-bores defined within the tube support plates whereby when the water-steam tubes become angularly oriented with respect to the tube support plates due to the aforenoted relative movements of either the tubes or the tube support plates with respect to each other, or simply when the tubes are in contact with the tube support plate aperture sidewalls due to eccentric alignment defined therebetween, excessive wear of the tubes was experienced due to abrasion developed between the tubes and the upper or lower annular edges of the tube apertures defined within the tube support plates, one attempt sought to provide such upper and lower aperture annular edges with rounded or chamfered edge surfaces. In accordance with another prior art attempt at resolving the aforenoted abrasion problems, the upper and lower regions of the through-bores or apertures were actually provided with conically-configured tapered surfaces which met at a central land portion. As may be surmised, however, despite both attempts at such a resolution of the problem, the problem persisted in view of the fact that the tubes nevertheless had to ride over or traverse the central land region which, in itself, presented a substantial edge portion about which the tubes would be bent and abraded. A still further, third type of attempt to resolve the aforenoted problem consisted in providing the interior sidewall portions of the tube support plate apertures with radially inwardly extending cusp-shaped projections upon which the tubes may be supported either by means of lineal or point contact surfaces. Nevertheless, such an attempted resolution to the problem also failed to in fact resolve the problem, for again, sharp-edged surfaces were present which still generated a considerable amount of abrasion upon the exterior sidewalls of the water-steam tubes.

The aforenoted problem has now in fact been resolved by means of an invention, developed by the inventor-applicant of the present patent application, wherein the tube support plate aperture interior sidewalls operationally interfacing with the water-steam tubes are provided with a smoothly curved hourglass configuration with continuously variable radial extents as defined within the transverse planes along the axis of the apertures or through-bores as determined by means of a constant external radius, the smoothly curved or arcuate surfaces extending between the upper and lower surfaces of the tube support plates. The details of this invention comprising an hourglass-shaped through-bore or aperture defined at each location within each tube support plate of the heat exchanger within which is disposed a water-steam tube is disclosed in applicant's co-pending patent application entitled MINIMUM WEAR TUBE SUPPORT HOLE DESIGN, U.S. patent application Ser. No. 576,679, filed on Feb. 3, 1984. The present application of the same inventor-applicant is directed toward a simplified cam-controlled boring bar tool system which is particularly capable of boring or forming the aforenoted hourglass configured through-bore within the tube support plates.

Accordingly, it is an object of the present invention to provide a new and improved cam-controlled boring bar tool system.

Another object of the present invention is to provide a new and improved cam-controlled boring bar tool system which can bore or form an hourglass-configured through-bore.

Still another object of the present invention is to provide a new and improved cam-controlled boring bar tool system which can bore or form an hourglass-configured through-bore or aperture within a heat exchanger tube support plate.

Yet another object of the present invention is to provide a new and improved cam-controlled boring bar tool system which can bore or form an hourglass-configured through-bore or aperture within a nuclear reactor steam generator heat exchanger tube support plate.

Still yet another object of the present invention is to provide a new and improved cam-controlled boring bar tool system which comprises a simplified mechanically-controlled system as opposed to conventional computer or numerically controlled boring bar tool systems.

Yet still another object of the present invention is to provide a new and improved cam-controlled boring bar tool system which is capable of being utilized in conjunction with conventional boring mills.

A further object of the present invention is to provide a new and improved cam-controlled boring bar tool system which is capable of boring or forming an hourglass-shaped aperture or bore within a nuclear reactor steam generator tube support plate so as to overcome the various disadvantages characteristic of conventionally shaped apertures or bores defined within such tube support plates.

A yet further object of the present invention is to provide a new and improved cam-controlled boring bar tool system which is capable of boring or forming an hourglass-configured aperture or bore within a heat exchanger tube support plate so as to effectively eliminate or optimally minimize abrasive wear upon the heat exchanger water-steam generator tubes as a result of relative movement manifested between the water-steam tubes and the tube support plates during reactor operation.

A still further object of the present invention is to provide a new and improved cam-controlled boring bar tool system which is capable of boring or forming an hourglass-configured aperture or bore within a heat exchanger tube support plate so as to effectively eliminate or optimally minimize abrasive wear upon the heat exchanger water-steam generator tubes so as to substantially extend the service lives thereof.

SUMMARY OF THE INVENTION

The foregoing and other objectives are achieved in accordance with the present invention through the provision of a cam-controlled boring bar tool system which is adapted, for example, for use upon a horizontal boring mill, although not necessarily limited thereto, wherein the boring mill is conventionally provided with a quill spindle and a face mill spindle. The face mill spindle is capable of rotation about its axis, while the quill spindle rotates with the face mill spindle in a coaxial manner, and in addition, is capable of translation along the axis thereof.

In accordance then with the present invention, a housing, having a cylindrical configuration within the left-half section thereof and a rectangular configuration within the right half section thereof as viewed along the longitudinal axis thereof, is fixedly mounted upon the face mill spindle, while a milling machine taper adaptor is fixedly connected to the quill spindle. A cam-controlled slide is, in turn, fixedly secured to the milling machine taper adaptor as a result of a pinned connection defined therebetween, and a single-point boring tool is fixedly secured within a tool holder bolted upon the right or free end of the cam-controlled slide. The cam-controlled slide has a rectangular configuration and is therefore confinedly disposed within the rectangularly configured right-half section of the housing in such a manner that no movement is permitted between the slide and the housing in a first transverse direction whereas limited movement is in fact permitted between the slide and the housing in a second transverse direction perpendicularly disposed with respect to the first direction. The rectangularly configured housing is formed, in part, by means of two side plates, and within one of the two side plates, there is provided a pair a cam slots. A pair of cam follower bearings are fixedly mounted upon the cam-controlled slide so as to project into the cam slots and operationally interface therewith. Consequently, as the cam-controlled slide is translationally moved relative to the rectangular housing under the influence or control of the quill spindle, the slide will be forced to move in the second transverse direction as dictated by the cam slots of the rectangular housing acting upon the cam follower bearings of the cam-controlled slide. The cam slots are in the form of predetermined sized arcuate curves, and consequently, as the milling machine taper adaptor and the cam controlled slide are axially translated under the control of the quill spindle, the cutting locus of the single point cutting tool disposed within the cam-controlled slide tool holder will define an arc matching that of the cam slots. In view of the fact that the slide and the cutting tool are simultaneously rotating under the influence of the quill spindle, the cutting tool arcuate cutting locus will define a 360° surface which, in turn, defines or forms the hourglass-configured bore within the tube support plates.

BRIEF DESCRIPTION OF THE DRAWINGS

Various other objects, features, and attendant advantages of the present invention will be more fully appreciated as the same becomes better understood from the following detailed description when considered in connection with the accompanying drawings, in which like reference characters designate like or corresponding parts throughout the several views, and wherein:

FIG. 2 is a side elevation view, partly in cross-section, of the new and improved cam-controlled boring bar system of the present invention for forming or boring the hourglass-configured apertures or bores within the heat exchanger tube support plates as illustrated in FIG. 1; and FIG. 3 is an end view of the cam-controlled boring bar system of FIG. 2 as viewed from a vantage point exteriorly of the right end portion of the cam-controlled boring bar system of FIG. 2.

DESCRIPTION OF THE PREFERRED EMBODIMENT

Figure 1:
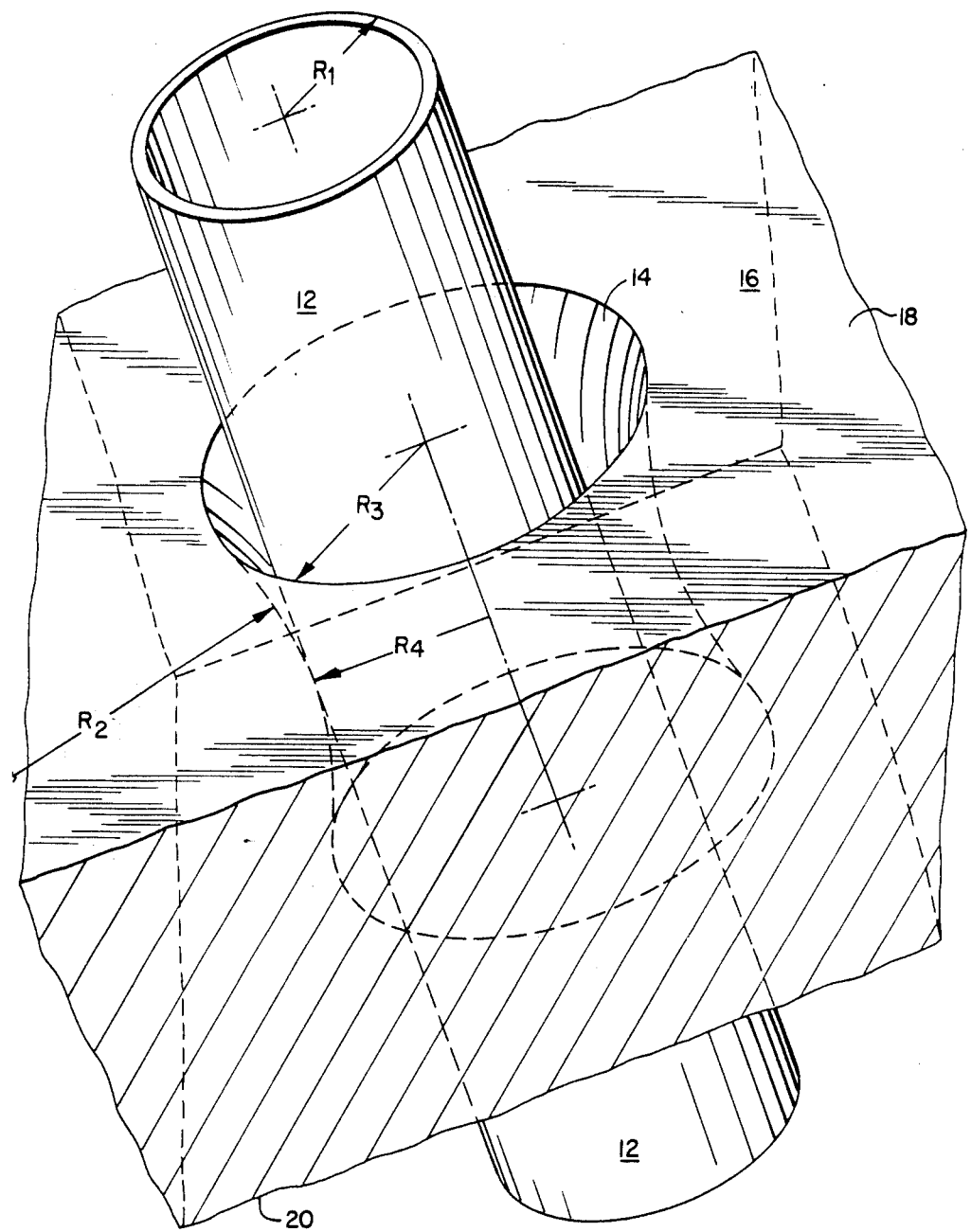
FIG. 1 is a perspective view of a tube support plate and a water-steam generator tube passing therethrough, wherein such assembly may be utilized within a nuclear reactor power plant heat exchanger, and wherein further, there is shown the desired hourglass configuration of the aperture or through-bore which is desired to be defined within each tube support plate so as to eliminate or minimize abrasive wear upon the water-steam generator tubes, all as more particularly disclosed within applicant's aforenoted copending patent application.

Referring now to the drawings, and more particularly to FIG. 1 thereof, there is illustrated the hourglass-configured aperture or bore as is desired to be defined within each tube support plate of the heat exchanger so as to substantially reduce and minimize, or eliminate, the abrasive wear conventionally impressed upon the water-steam generator tubes by means of the heat exchanger tube support plates when conventionally configured apertures or through-bores are defined within the tube support plates, all as more specifically disclosed in applicant's aforenoted copending patent application. Briefly, it is seen that the water-steam generator tubes 12, only one of which is illustrated, are adapted to pass through respective apertures or bores 14 defined within any one of the plurality of tube support plates 16 disposed within the heat exchanger, with the radial extent of each water-steam generator tube 12 being designated by the value R1. In accordance with applicant's copending patent application, and the invention disclosed therein, the aperture or bore 14 has an hourglass configuration as defined by means of a constant external radius R2, the arc of which extends from the upper surface 18 of the tube support plate 16 to the lower or bottom surface 20 of the tube support plate 16. In this manner, the radial extent of the hourglass aperture or bore 14 continuously varies from the maxium values R3 defined within the upper and lower surfaces 18 and 20 of the support plate 16, to the minimum value R4 defined within the central transverse or radial plane of the tube support plate 16.

Referring now to the FIGS. 2 and 3, there is disclosed the new and improved cam-controlled boring bar system of the present invention, as generally designated by the reference character 100, which is especially adapted for achieving the aforenoted hourglass-configured bore or aperture 14 defined within the tube support plates 16. In particular, the boring bar system 100 of the present invention is seen to comprise a substantially cylindrical, stepped housing 152 which is adapted to be fixedly secured to a face mill spindle, not shown, of, for example, a boring or jig mill. As a result of being secured to the face mill spindle, not shown, housing 152 rotates about the axis 154 of the boring bar system 100. In a similar manner, a milling machine taper adaptor 156 is fixedly secured to a quill spindle, not shown, of the particular boring or jig mill, as a result of which not only does milling machine taper adaptor 156 rotate about the axis 154, but in addition, the adaptor 156 is also capable of translational movement along the axis 154.

A cam-controlled slide 158, having a substantially rectangular configuration as viewed in cross-section transverse to axis 154, has its left end, as viewed in FIG. 2, fabricated in the form of a rectangular stem portion 160 which has a pair of diametrically opposed, laterally or transversely extending pins 162 engaged within elongated slots 164 defined within laterally or transversely spaced sidewalls 166 of the milling machine taper adaptor 156. Cam-controlled slide 158 is thus secured to milling machine taper adaptor 156 by means of the just-described pinned connection, and therefore, slide 158 rotates with adaptor 156 and its associated quill spindle, as well as translating with the same along axis 154. The rectangularly configured cam-controlled slide 158 is adapted to be disposed within a substantially rectangularly configured housing, and as best seen from FIG. 3, the rectangularly configured housing is defined by means of transversely or laterally spaced housing sections 168 and 170 which are fixedly secured to the cylindrical housing section 152, as well as a pair of laterally or transversely spaced sidewall plates 172 and 174. Dowel pins 176 may be fixedly secured within the sidewall plates 172 and 174 for mating with suitable apertures or blind bores, not shown, defined within the housing sections 168 and 170 whereby the sidewall plates 172 and 174 may be fixedly secured to the housing sections 168 and 170 by means of bolt fasteners 178.

A single-point tool holder 180, having a central or axial bore 182 defined therewithin for the reception of a single-point cutting tool, not shown, is adapted to be adjustably secured to the right end of the slide 158. In particular, a pair of diametrically opposed jack screws 184 are disposed within the right or free end of slide 158, and are adapted to engage the left or inner end of the tool holder 180. A plurality of bolt fasteners 186 are threadedly engaged within the right or free outer end of the slide 158, and it is noted that each bolt fastener 186 is operatively associated with elongated slots 188 defined within the outer end face 190 of the tool holder 180. In this manner, the jack screws 184 may be suitably actuated so as to radially position the tool holder 180 at its proper radial or transverse position relative to axis 154 and as permitted by means of elongated slots 188, whereupon bolt fasteners 186 may be subsequently threadedly engaged fully within slide 158 so as to retain the tool holder 180 in its proper position.

In accordance with the particularly unique structural feature of the present invention, a pair of cam slots 192 are defined within sidewall plate 172 so as to be substantially aligned with axis 154 within a common plane. In a similar manner, a pair of radially outwardly projecting cam follower bearings 194 are fixedly mounted within the cam-controlled slide 158 so as to be operatively engaged within the cam slots 192. The arcuate configuration of the cam slots 192 corresponds to the arcuate configuration of tube support plate aperture or bore 14 as defined by means of radial extent R2, and consequently, it will be appreciated that as the entire boring system 100 is rotated by means of the particular mill with which it is operatively associated, and as the milling machine taper adaptor 156 and slide 158 are moved translationally in the direction of axis 154, the cam slots 192 will cause cam followers 194 to follow the arcuate contours of the cam slots 192 whereby the hourglass configuration of aperture or bore 14 will be generated. It is to be noted that as a result of the arcuate configuration of the cam slots 192, the single-point cutting tool will be effectively moved radially inwardly and outwardly relative to axis 154 thereby achieving the boring of hourglass-configured bore 14, and such movement of the slide 158 and the tool holder 180 relative to adaptor 156 is facilitated by means of elongated slots 164 and the pins 162. Still further, as best seen FIGS. 2 and 3, while there is virtually no residual clearance defined between rectangularly configured slide 158 and the sidewall plates 172 and 174, there is such clearance gaps 196 and 198 defined between the cam-controlled slide 158 and the housing sections 168 and 170, respectively. In this manner, the radial movement of the slide 158, relative to the housing sections 168 and 170 as determined by means of cams 192 and followers 194, and as facilitated by pins 162 and slots 164, is able to be achieved. It is lastly noted that the axial length of the cam slots 192 will of course determine the axial length of the hourglass-configured bore 14 defined within the tube support plate 16.

Obviously, many modifications and variations of the present invention are possible in light of the above teachings. For example, the cam plate 172 may be simply removed from the housing sections 168 and 170 and replaced with cam plates having different configurations as may be desired dependent upon the particularly desired configuration of, for example, the bore to be formed within a particular workpiece. In addition, it is also to be noted that while machines and systems exist whereby a boring tool may in fact be controlled in a manner similar to that of the present invention in order to achieve a particularly configured bore within a workpiece, such as, for example, the hourglass configured bore 14, such conventional machines are numerically or computer-controlled as opposed to the mechanical cam-controlled apparatus of the present invention. It is therefore to be understood that within the scope of the appended claims, the present invention may be practiced otherwise than as specifically described herein.

I claim:

1. Boring apparatus for generating a bore within a workpiece, comprising:
    a first housing including means for attachment of said first housing to a first means for rotating said first housing about a predetermined axis;
    a second housing, disposed within said first housing and having a cutting tool mounted thereon, including means for attachment of said second housing to a second means for rotating said second housing about, and translating said second housing in an axial direction;
    means defined between said first and second housings supporting said second housing for axial and transverse movement; and
    means defined between said first and second housings controlling the transverse movement of said second housing and said cutting tool relative to said predetermined axis and said first housing in response to said axial movement of said second housing so as to generate a bore within said workpiece having a predetermined configuration as determined by said controlling means.

2. Boring apparatus as set forth in claim 1, wherein: said first means to which said first housing is to be attached is a face mill spindle of a boring mill.

3. Boring apparatus as set forth in claim 1, wherein: said second means to which said second housing is to be attached is a quill spindle of a boring mill.

4. Boring apparatus as set forth in claim 1, wherein said controlling means comprises:
    at least one cam slot defined within said first housing; and
    at least one cam follower mounted within said second housing for operative engagement with said at least one cam slot defined within said first housing.

5. Boring apparatus as set forth in claim 4, wherein:
    said at least one cam slot has an arcuate configuration,
    whereby as said second housing and said cutting tool mounted thereon rotate, and axially move so as to generate said bore within said workpiece, said at least one arcuately configured cam slot will cause said at least one cam follower and said second housing-cutting tool assembly to undergo transverse radial movements so as to generate an hourglass configured bore.

6. Boring apparatus as set forth in claim 4, wherein:
    said first housing has two axially spaced cam slots defined therein; and
    said second housing has two axially spaced cam followers mounted therein.

7. Boring apparatus as set forth in claim 4, wherein:
    said first housing has a substantially rectangular configuration; and
    said second housing has a substantially rectangular configuration.

8. Boring apparatus as set forth in claim 7, wherein:
    at least one side of said rectangularly configured first housing is defined by means of a removable plate; and
    said at least one cam slot is defined within said at least one removable plate,
    whereby different bore configurations can be generated by means of different cam slot plates having differently configured cam slots defined therein.

9. Boring apparatus as set forth in claim 1, further comprising:
    means for adjusting the disposition of said cutting tool within said second housing.

10. Boring apparatus as set forth in claim 9, wherein said adjustable means comprises:
    a tool holder mounted upon said second housing for holding said cutting tool therewithin; and
    a pair of diametrically opposed jack screws mounted within said second housing and operatively engaged with said tool holder.

11. Boring apparatus as set forth in claim 3, wherein said means for attachment of said second housing to said quill spindle comprises:
    a milling machine taper adaptor;
    elongated slot means defined within said milling machine taper adaptor; and
    transversely extending pins mounted upon said second housing and operatively engaged with said elongated slots of said milling machine taper adaptor.

12. Boring apparatus as set forth in claim 1, wherein: both of said first and second housings have substantially rectangular configurations.

13. Boring apparatus as set forth in claim 12, further comprising:
    gap means defined between said first and second housings for permitting said second housing to move transversely relative to said first housing under the influence of said controlling means.

14. Boring apparatus for generating a bore within a workpiece, comprising:
   a first housing including means for attachment of said first housing to a first means for rotating said first housing about a predetermined axis;
   a second housing, disposed within said first housing and having a cutting tool mounted thereon, including means for attachment of said second housing to a second means for rotating said second housing about said predetermined axis, and for translating said second housing in an axial direction relative to said first housing;
   means defined between said first and second housings supporting said second housing for axial and transverse movement; and
   means defined between said first and second housings for controlling the transverse movement of said second housing and said cutting tool relative to said predetermined axis and said first housing in response to said axial movement of said second housing relative to said first housing so as to generate a bore within said workpiece having a predetermined configuration as determined by said controlling means.

15. Boring apparatus as set forth in claim 14, wherein said controlling means comprises:
   at least one cam slot defined within said first housing; and
   at least one cam follower mounted within said second housing for operative engagement with said at least one cam slot defined within said first housing.

16. Boring apparatus as set forth in claim 15, wherein: said at least one cam slot has an arcuate configuration, whereby as said second housing and said cutting tool mounted thereon rotate and axially move so as to generate said bore within said workpiece, said at least one arcuately configured cam slot will cause said at least one cam follower and said second housing-cutting tool assembly to undergo transverse radial movements so as to generate said bore within said workpiece wherein the internal annular sidewall of said bore is continuously arcuate from one surface of said workpiece to another surface of said workpiece as defined by means of a predetermined radius externally disposed with respect to said bore.

17. Boring apparatus for generating a bore within a workpiece, comprising:
   a first housing including means for attachment of said first housing to a first means for rotating said first housing about a predetermined axis;
   a second housing, disposed within said first housing and having a cutting tool mounted thereon, including means for attachment of said second housing to a second means for rotating said second housing, and translating said second housing in an axial direction,
   means defined between said first and second housings supporting said second housing for axial and transverse movement; and
   relatively transversely moveable means defined between said first and second housings for causing corresponding transverse movement of said second housing and said cutting tool relative to said predetermined axis and said first housing in response to said axial movement of said second housing so as to generate a bore within said workpiece having a predetermined configuration as determined by said means causing said corresponding movement of said second housing and said cutting tool.

18. Boring apparatus as set forth in claim 17, wherein said means for causing said corresponding movement of said second housing and said cutting tool comprises:
   at least one cam slot defined within said first housing; and
   at least one cam follower mounted within said second housing for operative engagement with said at least one cam slot defined within said first housing.

19. Boring apparatus as set forth in claim 18, wherein: said at least one cam slot is arcuate in its configuration whereby said generated bore has an hourglass configuration.

20. Boring apparatus as set forth in claim 19, wherein: the length of said cam slot defines the length of said hourglass portion of said generated bore.

* * * * *